US005377863A

United States Patent [19]

Widman

[11] Patent Number: 5,377,863

[45] Date of Patent: Jan. 3, 1995

[54] MANIPULATABLE CONTAINER CLAMP

[76] Inventor: Bruno Widman, 534 E. Lincoln Highway, DeKalb, Ill. 60115

[21] Appl. No.: 255,744

[22] Filed: Jun. 7, 1994

[51] Int. Cl.[6] ...... B01D 35/28

[52] U.S. Cl. ...... 220/696; 220/695; 220/735

[58] Field of Search ...... 220/695, 696, 697, 700, 220/735, 701; 248/113

[56] References Cited

U.S. PATENT DOCUMENTS

| | | | |
|---|---|---|---|
| 1,928,995 | 10/1933 | DeBiasi | 220/735 |
| 2,390,874 | 12/1945 | Endebrock | 220/735 |
| 2,606,689 | 8/1952 | Kistner | 220/695 |
| 2,788,153 | 4/1957 | Broadbelt | 220/695 |
| 4,995,526 | 2/1991 | Garrison | 220/735 |

*Primary Examiner*—Joseph Man-Fu Moy
*Attorney, Agent, or Firm*—Augustus G. Douvas

[57] ABSTRACT

A manipulatable and detachable container clamp adapted to engage an open paint container. The clamp has an elongated body formed into a manual gripping handle and a platform support. A flared brush-cleaning and brush-support platform is fixed to the platform support so as to project away from the handle. A container-engaging clamping bracket having a pair of spaced fingers is fixed to the body with each finger facing opposite sides of the container sidewall when the bracket is seated upon the upper edge of the container so that the platform projects into the container. A manually-adjustable screw is coupled to the bracket for clamping the bracket tightly upon any container engaged by the bracket. One of the bracket fingers is preferably seated in a paint-container reinforcing groove which is commonplace in many paint containers. This seating arrangement enables the clamp to be fixedly secured to the paint container.

10 Claims, 2 Drawing Sheets

MANIPULATABLE CONTAINER CLAMP

BACKGROUND OF THE INVENTION

This invention relates to manipulatable and detachable container clamps, and in particular to an improved clamp for use with containers housing paint which is to be brush applied.

The prior art includes a substantial number of manipulatable clamps which may be applied to containers. United States patents of general interest include the following:

U.S. Pat. No. 5,203,471 issued Apr. 20, 1993 to the present inventor;

U.S. Pat. No. 2,689,760 issued Sep. 21, 1954 to J. A. Vanoui;

U.S. Pat. No. 2,742,315 issued Apr. 17, 1950 to R. C. Drier;

U.S. Pat. No. 2,905,500 issued Sep. 22, 1959 to T. S. Thombs;

U.S. Pat. No. 3,261,633 issued Jul. 19, 1966 to D. Sakuta; and

U.S. Pat. No. 3,305,261 issued Feb. 21, 1967 to R. L. Swanke

SUMMARY OF THE INVENTION

A principal object of this invention is to provide a container clamp which is basically a single, unitary, economically-fabricated piece which may be reliably clamped to paint containers of varying sizes to provide container support by either a hook or ladder rung with temporary storage capability for a paint brush thus enabling a painter to free both hands from brush and container holding tasks.

A preferred embodiment of my invention comprises a manipulatable and detachable container adapted to engage an open paint can. The clamp has an elongated body formed into a manual gripping handle and a platform support. A flared brush-cleaning and brush-support platform is fixed to the platform support so as to project away from the handle. A container-engaging clamping bracket having a pair of spaced fingers is fixed to the body with each finger facing opposite sides of the container sidewall when the bracket is seated upon the upper edge of the container so that the platform projects into the container. A manually-adjustable screw is coupled to the bracket for clamping the bracket tightly upon any container engaged by the bracket. One of the bracket fingers is preferably seated in a paint-container reinforcing groove which is commonplace in many standardized paint containers. This seating arrangement enables the clamp to be fixedly secured to the paint container. In one embodiment, a curved hook fixed to the clamp body enables the clamp and attached container to be hung from a ladder rung with a paint brush stored on the platform. In an alternative embodiment, an apertured finger is attached to the clamp body with a hook engaging the finger aperture for hanging the container. With either embodiment, both hands of a painter are freed from container and brush holding tasks.

DESCRIPTION OF THE DRAWINGS

In order that all of the structural features for attaining the objects of this invention may be readily understood, reference is made to the accompanying drawings wherein.

DETAILED DESCRIPTION OF THE PREFERRED EMBODIMENT

Figure 1:
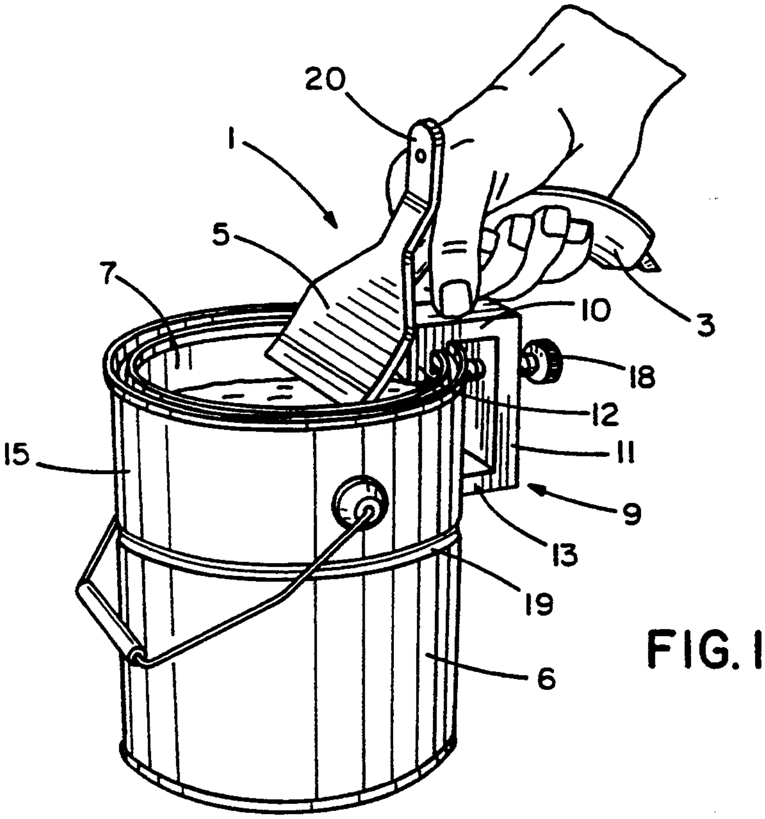
FIG. 1 is a perspective view of the manipulatable and detachable container clamp cf this invention attached to an open paint container.
Figure 2:
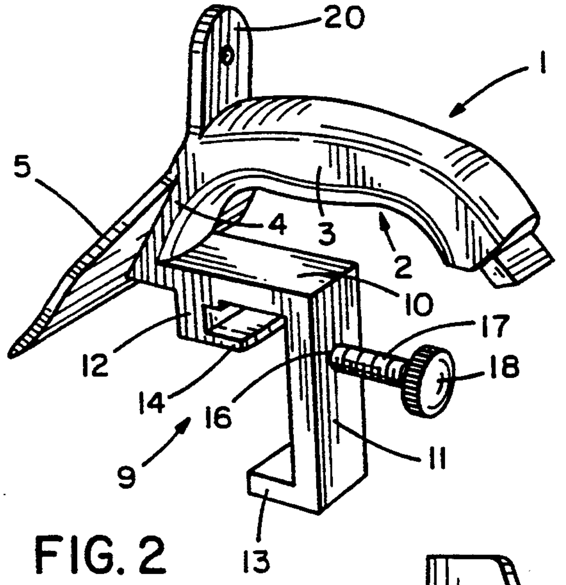
FIG. 2 is a perspective view of the clamp.
Figure 3:
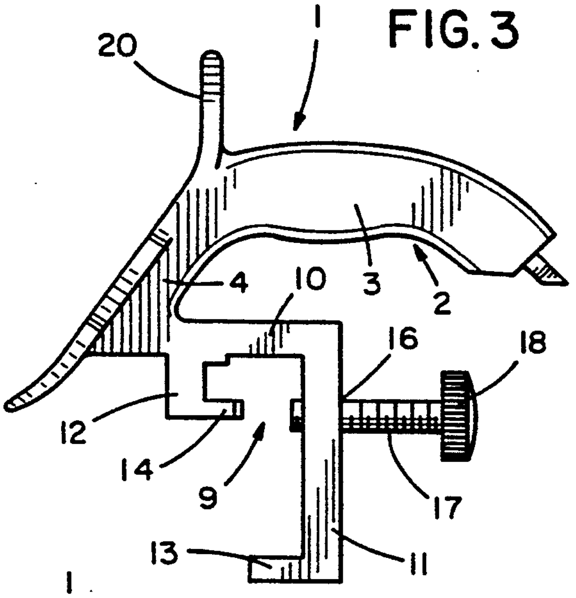
FIG. 3 is a side elevation view of the clamp.
Figure 4:
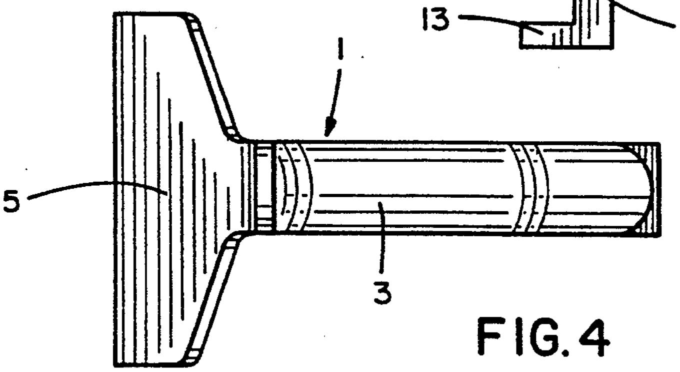
FIG. 4 is a plan view of the clamp.
Figure 5:
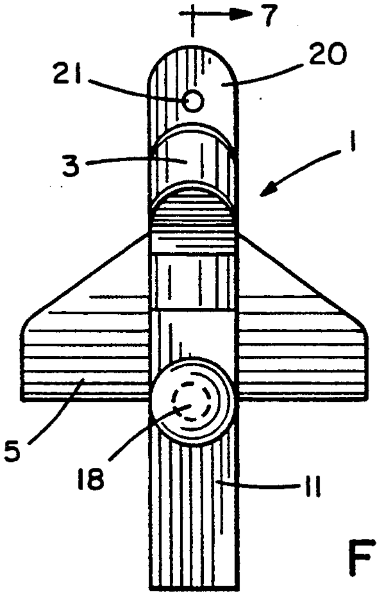
FIG. 5 is an end-elevation view of the clamp.
Figure 6:
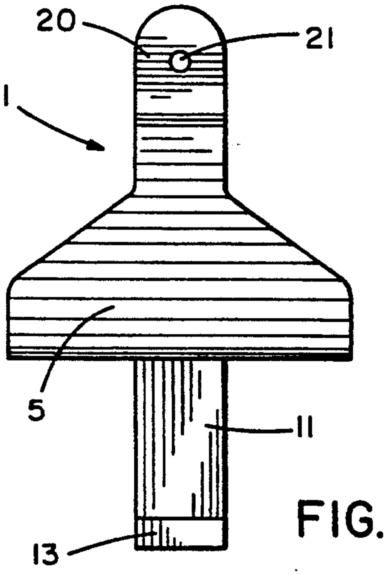
FIG. 6 is an end-elevation view of the clamp opposite the end view of FIG. 5.

Referring to the drawings, manipulatable and detachable container clamp 1 of this invention is preferably formed as a single unitary piece from a plastic which cures to a rigid form, such as polyethylene (FIGS. 2–6).

Figure 7:
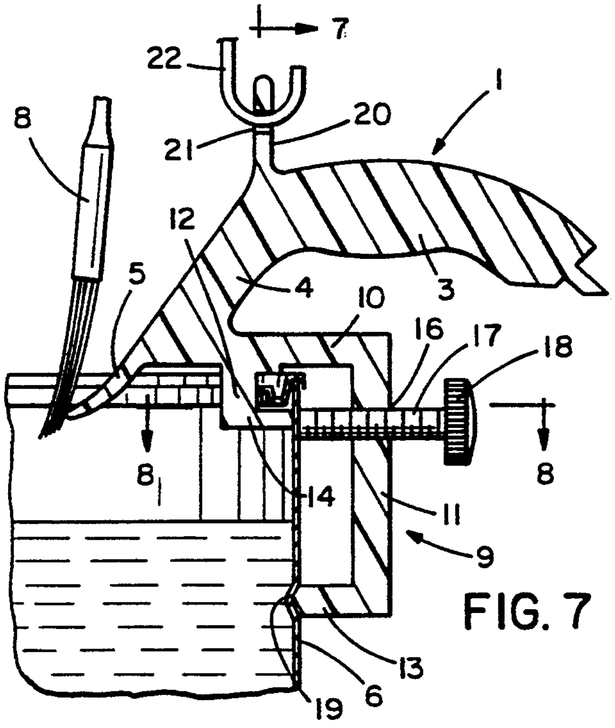
FIG. 7 is a partial section view taken along line 7—7 of FIG. 5 with the clamping screw shown in full.
Figure 8:
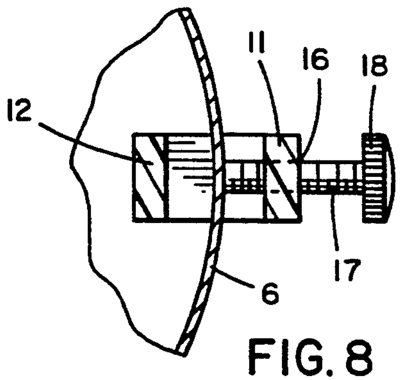
FIG. 8 is a section view taken along line 8—8 of FIG. 7.
Figure 9:
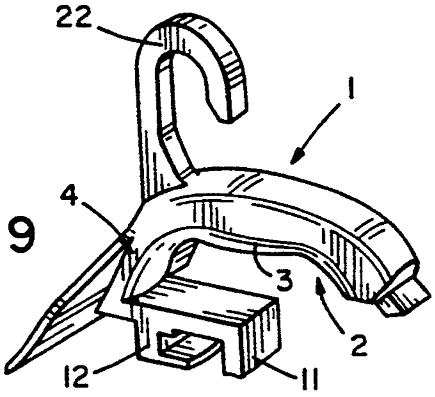
FIG. 9 is a perspective view of the clamp which shows a modification for hanging the clamp from a ladder rung.
Figure 10:
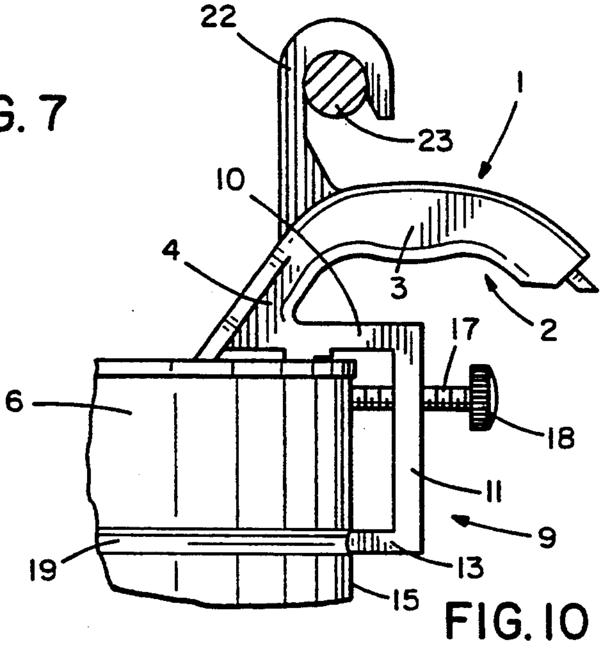
FIG. 10 is a side elevation view which shows the clamp with an engaged container hanging from a ladder rung.

Clamp 1 has a generally C-shaped body 2 formed into a manual gripping handle 3 and a platform support 4. A flared brush-cleaning and brush-support platform 5 is fixed to the platform support. When clamp 1 engages container 6 (FIGS. 1, 7 and 9), platform 5 projects into container access opening 7 and handle 3 projects away from container 6.

Container 6 preferably contains paint as clamp 1, with its brush-cleaning and brush-support platform 5, is designed to facilitate a painter's holding and moving a paint container. Platform 5 is used either to drain the bristles of a paint-containing brush 8 with the paint dripping into container 6 (FIG. 7), or alternatively to support a paint brush whose handle rests on the upper edge of container 6.

Container 6 is engaged by a container-engaging clamping bracket 9 (FIGS. 2, 3, 7 and 10). Bracket 9 comprises an arm 10 which extends from platform support 4, and a pair of L-shaped fingers 11 and 12. Finger 11 has a longer extension than finger 12. Accordingly, finger contact elements 13 and 14 of fingers 11 and 12, respectively, contact sidewall 15 of container 6 at widely separated areas along sidewall 15. This separation of sidewall contact areas enables bracket 9 to engage securely sidewall 15 of container 6. The separation between the extremities of contact fingers 13 and 14 enable a painter to place bracket 9 easily over the upper edge and rim of container 5. Finger 11 is formed with a threaded hole 16 (FIGS. 2, 3, 7 and 10) which receives threaded adjusting screw 17. Manual rotation of knob 18 fixes bracket 9 securely to sidewall 15.

Many paint containers are formed with a reinforcing groove 19 which is located a standardized distance from the upper edge or rim of container 6. In a preferred design of clamp 1, finger 11 is of a length that enables its finger contact element 13 to engage and lock into groove 19. This design further enhances the clamping attachment of bracket 9 to sidewall 15.

An apertured finger element 20 projects from body 2 (FIGS. 1, 2, 3, 5, 6 and 7). Element 20 is formed with a hole 21 which is adapted to receive a hook 22 (FIG. 7) so that clamp 1 and an engaged paint container can be suspended together as may be designed by a painter. Alternatively, a rung hook 22 (FIGS. 9 and 10) may be utilized for suspending a clamp-engaged paint container. When hook 22 engages ladder rung 23 (FIG. 10), and brush 8 rests on the upper edge of container 6 and platform 5 a painter is free to use both hands for tasks not involving holding a paint container.

It should be understood that modifications can be made in the preferred embodiment without departing from the scope of the invention.

What is claimed is:

1. A manipulatable detachable container clamp adapted to engage a container formed with a continuous sidewall which terminates in a set of top and bottom peripheral edges separated one from the other by the sidewall and with the container having a top access opening defined by the top peripheral edge, comprising an elongated body formed into a manual gripping handle and a platform support with the handle located at opposite ends of the body, a flared brush-cleaning and brush-support platform fixed to the platform support so as to project away from the handle, a container-engaging clamping bracket having a pair of spaced fingers with the bracket fixed to the body and with each finger facing opposite sides of the container sidewall when the bracket is seated upon the upper edge of the container so that the brush-cleaning and brush-support platform projects into the container access opening and the handle projects away from the opening, and manually adjustable means coupled to the bracket for clamping the bracket tightly upon any container engaged by the bracket.

2. The clamp of claim 1 in which the adjustable means is a threaded screw engaging the finger located on the outside of the container sidewall when the bracket is seated upon the upper edge of the container, and with that outside finger having a threaded hole for receiving the threaded screw.

3. The clamp of claim 1 in which both bracket fingers are generally curved and terminating in sidewall contact elements that face one another on opposite sides of the container sidewall.

4. The clamp of claim 1 in which the two bracket fingers extend different distances along the container sidewall when the bracket is seated upon the upper edge of the container.

5. The clamp of claim 1 in which each finger is generally of an L-shaped configuration.

6. The clamp of claim 1, comprising a clamp-hanging finger element attached to the body so that the detachable clamp and any engaged container can be hung from a support, such as, a ladder rung or wire hook.

7. The clamp of claim 1 in which the container is formed with a peripheral sidewall reinforcing groove, and the bracket fingers located on the outside of the container extend to and are seated in the reinforcing groove when the bracket is seated upon the upper edge of the container.

8. The clamp of claim 2 in which both bracket fingers are generally curved and terminate in sidewall contact elements that face one another on opposite sides of the container sidewall.

9. The clamp of claim 8 in which the two bracket fingers extend different distances along the container sidewall when the bracket is seated upon the upper edge of the container.

10. The clamp of claim 9 comprising a clamp-hanging finger element attached to the body so that the detachable clamp and any engaged container can be hung from a support.

* * * * *